Dec. 30, 1952  B. W. SEWELL  2,623,805
WELL LOGGING APPARATUS
Filed Sept. 7, 1946  4 Sheets-Sheet 2

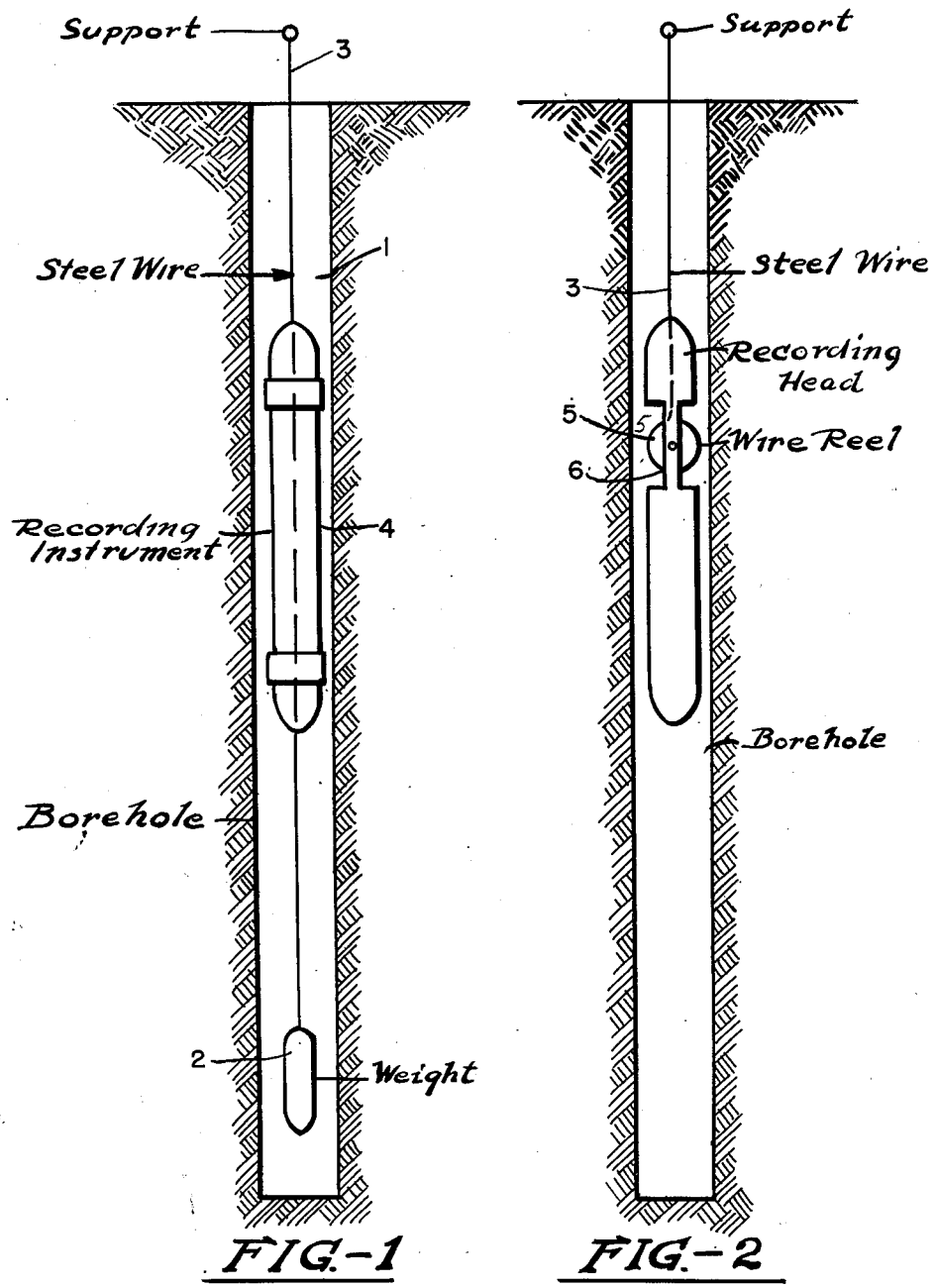

Benjamin W. Sewell Inventor
By R. J. Whelan Attorney

Dec. 30, 1952  B. W. SEWELL  2,623,805
WELL LOGGING APPARATUS
Filed Sept. 7, 1946  4 Sheets-Sheet 3

Benjamin W. Sewell Inventor
By P. J. Whelan Attorney

Patented Dec. 30, 1952

2,623,805

UNITED STATES PATENT OFFICE 2,623,805

WELL LOGGING APPARATUS

Benjamin W. Sewell, Tulsa, Okla., assignor to Standard Oil Development Company, a corporation of Delaware Application September 7, 1946, Serial No. 695,575

2 Claims. (Cl. 346—33)

The present invention is directed to a method and apparatus for logging bore holes.

Various methods for logging bore holes drilled for petroleum or for other purposes have been developed. These various methods involve the measurement of different properties of the strata traversed by the bore hole. Not only have properties of the strata been investigated, but physical conditions in the bore hole, such as temperature and pressure, have been measured and correlated with depth to produce logs which supply useful information. Practically all of these methods require the use of electrical conductors lowered into a bore hole and electrical recording devices at the surface. The electrical recording device commonly embodies a recording galvanometer which, because of inertia and other factors, imposes limitations upon the speed with which the record can be made which in turn limits the speed at which the scanning or probe device can be passed through the bore hole.

According to the present invention, a simple logging method is provided in which there is no practical limitation on speed of operation in the bore hole. Briefly, the method of the present invention utilizes the type of recording known as magnetic wire recording. The present invention contemplates the measurement of any value or quantity in a bore hole correlated with depth. The invention does not constitute merely the substitution of magnetic wire recording for some other conventional type of recording. The utilization of this type of recording and logging introduces problems which have been solved by the present invention. For example, in passing through the bore hole, a probing device translates the quantity or value to be measured into an electrical quantity of variable frequency which is recorded on the wire. The interpretation of the record necessitates that some measure be made of time in order that the frequency recorded may be ascertained. In other words, in interpreting the record one must be able to associate a given number of cycles with a given period of time rather than the length of the wire occupied by the record.

The present invention may be practiced in a plurality of ways. Considered from one point of view, there are two types of operation. The first type is one in which a wire is lowered into the bore hole and held in tension by a weight at its lower end so that the length of wire is substantially co-extensive with the depth of the bore hole. The probing device is dropped or moved down the bore hole with its recording mechanism encircling the wire. When the probing device has reached the bottom, the entire assembly is pulled out of the hole and the wire can then be passed through a device which plays back the signals. This play-back can be utilized in many ways. It can be used to operate pen recorders or other conventional recorders to produce a printed or visible record. In this embodiment, the probing device impresses its signal on the wire line directly opposite the point to which the value being recorded is to be related. In fact, this type of logging may be said to constitute making a full scale impression of the bore hole.

In the other general type of operation contemplated according to the present invention the probing device has incorporated in it a reel of wire which is unwound as the probe moves down the bore hole. The wire in unwinding passes through a recording means in the upper part of the probe which impresses the signal or value to be measured on the wire.

By either of these types of procedure various logging methods can be practiced. As before indicated, the probing device may be so constituted as to produce a signal representing any desired property or value in the bore hole. Two or more values can be recorded simultaneously by utilizing oscillators of widely different frequency ranges so that two separate signals are simultaneously imparted to the wire. Among the properties of the formation which may be recorded are its electrical conductivity, its self potential, its dielectric strength, its radio activity, its permeability to sound waves and the like. Other values which are commonly measured are the temperature and the pressure. In addition, hardness measurements can be made. Likewise, diameter measurements along the bore hole can be made in similar manner.

The nature of the present invention and some of the specific modes of operation contemplated thereby may be more clearly understood from the following detailed description of the accompanying drawing; in which, Fig. 1 is a diagrammatic representation of one general mode of operation contemplated by the present invention;

Fig. 2 is a similar illustration of a second general mode of operation;

Figure 4:
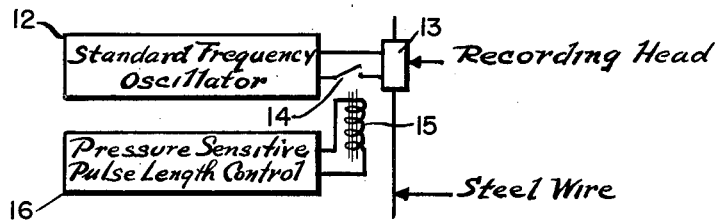
Figure 5:
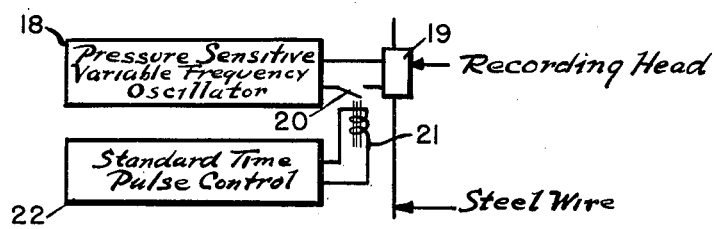
Figure 6:
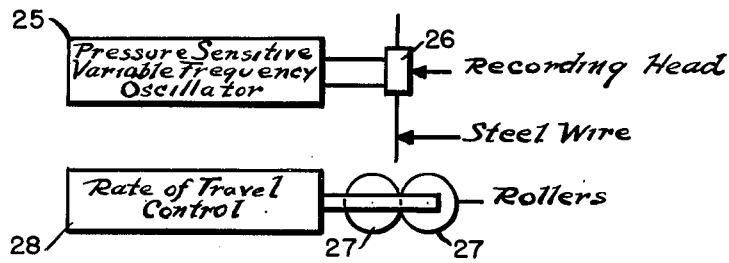
Figure 7:
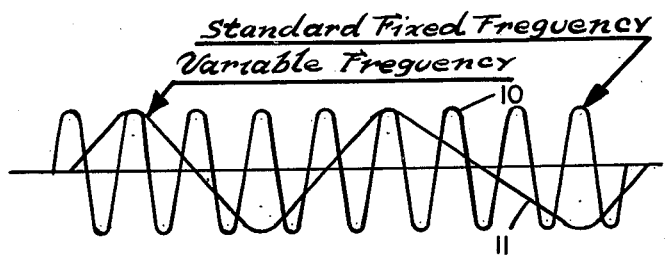
Figure 9:
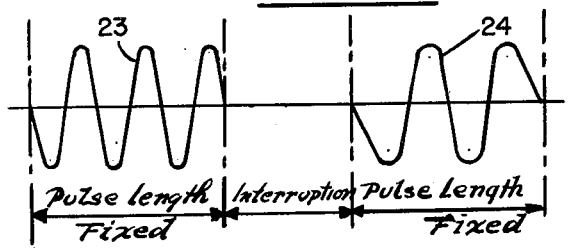
Figure 10:
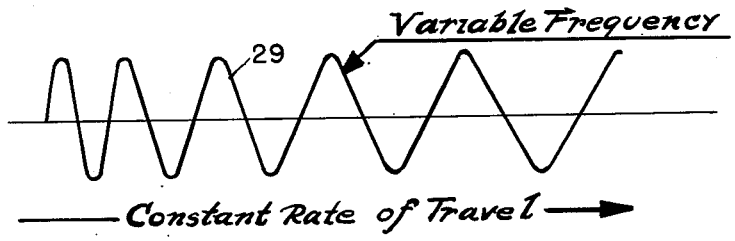
Figure 11:
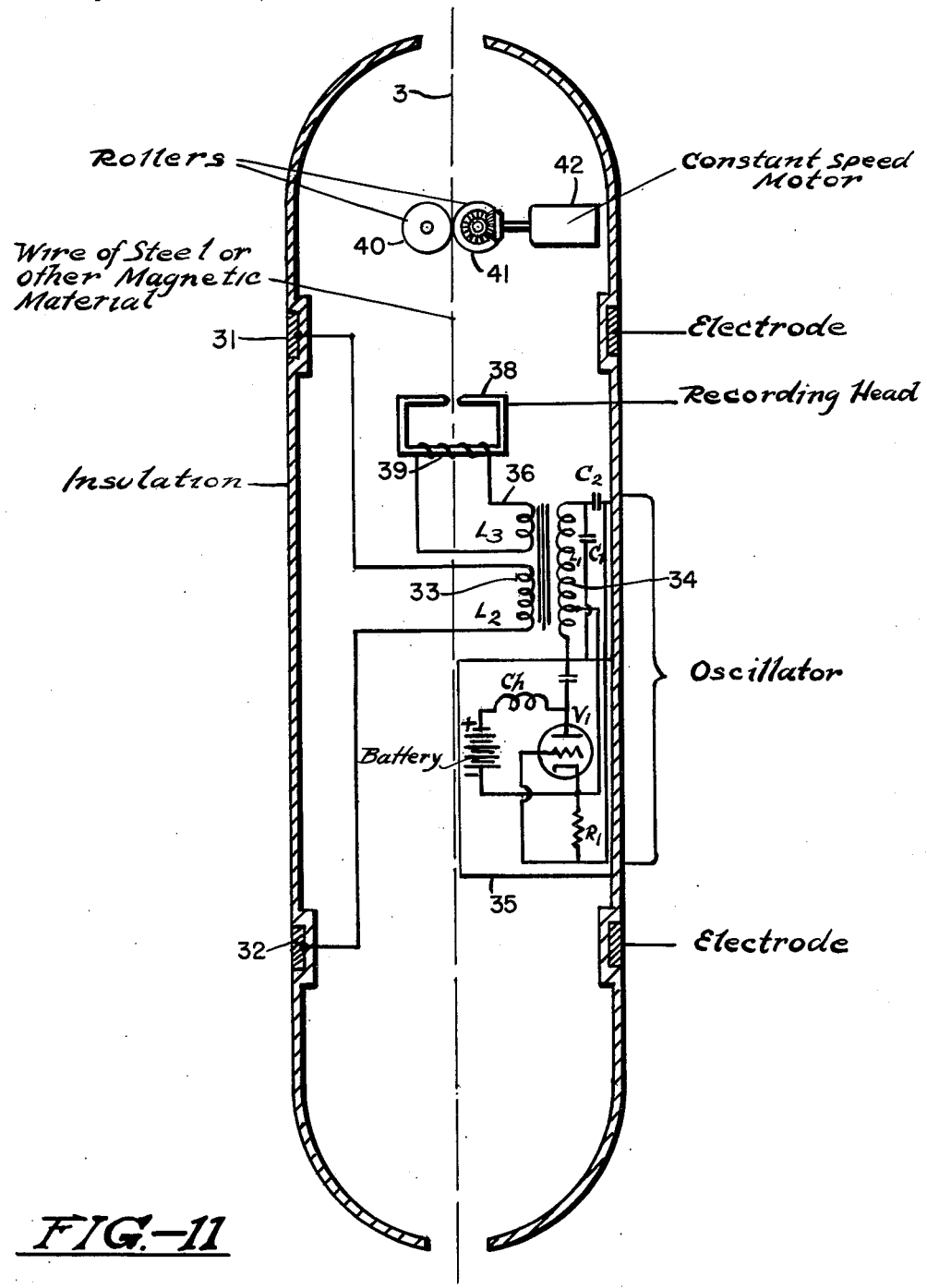

Figs. 4, 5 and 6 each depicts a different specific mode of operation which may be carried out according to either of the general modes of operation;

Figs. 7 to 10, inclusive, each illustrates a mode of interpreting the records obtainable according to the specific modes of operation represented by Figs. 3 to 6, inclusive; and, Fig. 11 is a particular type of probe which may be employed in the general mode of operation illustrated in Fig. 1.

Referring to Fig. 1 in detail, numeral 1 designates a bore hole in which is suspended a weight 2 at the end of a magnetizable wire 3. A probing device 4 is shown mounted in slidable position on and embracing the wire 3. This probe 4 contains the apparatus necessary for measuring the value or quantity of interest and for fixing a signal representing that value or quantity on the wire. In utilizing this type of device the wire may carry spaced depth marks whereby measurement of the wire in interpreting the record is unnecessary. Wherever reference is made to wire herein it is to be understood that no limitation as to cross-sectional configuration or dimension is intended. Actually, the recording wire can conveniently assume the shape of a flat tape on which depth indications can readily be printed or otherwise indicated. Of course the conventional practice of measuring the wire as it is being run through the reproducer can also be resorted to in order to correlate the values recorded on the wire with depth.

In Fig. 2 the wire 3 is carried on a reel 5 journaled in bracket arms 6 which are an integral part of the probing device. In this arrangement the electrical or other elements required for measuring the value of interest are contained in the lower part of the probe and the signal representing the value is transmitted by wires to the upper part of the probe to the recording head, by which is meant the device which impresses the signal on the wire.

As previously indicated, there are innumerable specific modes of procedure by which the present invention can be practiced. Some of these are shown in Figs. 3 to 6, inclusive. It may be pointed out that each of these specific modes of operation takes into account the problem of relating the signals on the wire to a definite time period or a definite rate of travel of the probing device.

Figure 3:
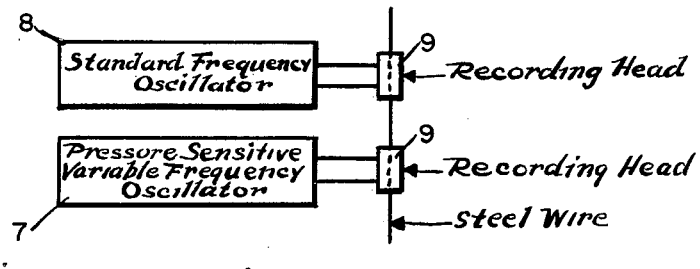
Fig. 3 is a diagrammatic representation of one specific mode of operation which may be conducted according to either of the general modes.

In Fig. 3, for example, the probing device contemplated is one which measures pressure and embodies a variable frequency oscillator 7 having a pressure sensitive element which effects changes in the output frequency of the oscillator with changes in pressure. The probe also carries a standard frequency oscillator 8, such as an oscillator putting out 60 cycles or any other selected constant frequency. Each of these oscillators is shown connected with a separate recording head 9. Actually, a single recording head may be employed, particularly when oscillator 7 is one which has a frequency output widely different from the constant frequency output of the oscillator 8. The record obtainable in playing back the wire resulting from this procedure will have in effect the appearance shown in Fig. 7 in which numeral 10 is the signal impressed on the wire by the oscillator of constant frequency output and 11 designates the signal put on the wire by the variable frequency oscillator 7. Since the signal 10 is of constant known frequency, its presence on the record makes it possible for the interpreter to place time lines on the record from which he can determine the frequency of the signal 11. Changes in frequency in this signal are the significant information which the operator seeks.

In the embodiment shown in Fig. 4, the probing device is, again for illustrative purposes, one which measures pressure. This probing device embodies a standard oscillator 12 with a constant frequency output which is delivered to the recording head 13. The transmission line includes a switch 14 which is operated by a solenoid 15 which in turn is periodically energized for a period proportional to the pressure. This period is fixed by an element 16 which supplies current to the solenoid 15 for periods proportional to the pressure to which the element 16 is subjected. This element may assume many forms. One simple form is a bridge circuit in which one leg contains a resistor which varies with the pressure and the balancing leg includes a rotating scanning device which will keep the circuit closed until balance is attained. Therefore, in such an arrangement the time required to achieve balance, where the scanning device operates at constant speed, is proportional to the pressure and with such a device energizing current can be supplied to the solenoid 15 for a period proportional to the pressure to which the element 16 is subjected.

Figure 8:
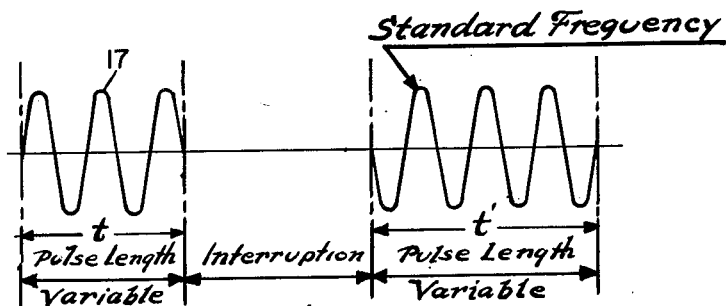

The type of record obtained by the play back of the wire resulting from this mode of operation is illustrated in Fig. 8 in which numeral 17 designates the signal put out by the constant frequency oscillator. This output will vary in duration, depending on the pressure at the depth represented. In Fig. 8 there are shown two pulses of length $t$ and $t'$ respectively. The interpreter merely reads pressure in terms of pulse duration.

In Fig. 5 the arrangement shown differs from that in Fig. 4 in that the pulse duration is held constant and the frequency allowed to vary in accordance with pressure. In this embodiment numeral 18 designates a variable frequency oscillator, the output frequency of which is controlled by pressure. This output frequency is delivered to a recording head 19. Here, again, the transmission line includes a switch 20 operated by a solenoid 21 which is supplied energizing current for fixed periods of time by a unit 22 controlled by clockwork or other suitable mechanism. The record obtainable by the play back of the wire resulting from this mode of operation is shown in Fig. 9 in which the signal is designated by numeral 23 in one pulse and numeral 24 in a second pulse. These pulses are of the same duration and each represents a fixed time value. In interpreting this record, the operator reads pressure as frequency.

In the embodiment shown in Fig. 6, the factor of travel rate is taken care of by providing a constant travel rate of the probe. In this embodiment the probe includes a variable frequency oscillator 25, the output frequency of which varies with pressure or whatever other property or value is to be measured. The output of this oscillator is delivered to the recording head 26. The probe also carries a pair of rollers 27 which hold the wire between them and have strong frictional contact with it. These rollers are driven at a constant speed by a constant speed motor 28. The record obtainable by the play back of the wire resulting from this type of operation is shown in Fig. 10 in which the signal of interest is designated by numeral 29. Here in this case, since the rate of travel of the probe is fixed, it is possible for the interpreter to mark time lines on the record based on the rate of travel of the probe and in this way determine the frequency output of the oscillator at any given time.

In Fig. 11 is shown a particular type of probe intended for operation according to the general procedure illustrated in Fig. 1 and more specifically in Fig. 6. This probe is in the form of a shell or bomb 30, composed of insulating material, such as Bakelite or similar material. Imbedded in the outer wall of the shell are spaced electrodes 31 and 32 in the form of metal rings counter-sunk in the shell. While the shell has been shown composed entirely of insulating material, it will be apparent that the shell can be composed of any suitable material, including steel, so long as the electrodes 31 and 32 are suitably insulated from the shell and from each other. The electrodes are connected by suitable conductors to a winding 33 of a transformer, the other winding 34 of which is in the tank circuit of an oscillator, the electronic elements of which are encased in a box 35. It will be understood that the bore hole will usually be filled with fluid of some kind which, unless precautions are taken, will flow into the interior of the probe. In the embodiment shown, the only parts which require protection are the electronic elements of the oscillator and the motor hereinafter mentioned and these may be easily enclosed in fluid tight cases. It will be understood that no particular emphasis is laid upon the simple oscillator illustrated since any type of oscillator may be utilized provided it is one the output frequency of which responds to changes in impedance in the tank circuit.

In inductive relation to the winding 34 is a third winding 36, the terminals of which are connected to a coil 37 wound on magnetic core 38 between the pole pieces of which the wire 3 passes. It will be apparent that as the impedance of the formation between the electrodes 31 and 32 changes, the output frequency of the oscillator will change which in turn will change the frequency of the magnetic field between the pole pieces of the magnetic core.

The wire 3 also passes between friction rollers 40 and 41, the latter being driven through suitable gearing by a constant speed motor 42.

As previously indicated, the type of record obtainable by the utilization of this apparatus is illustrated in Fig. 10 in which earth impedance is read as frequency.

Various changes in mode of operation and in design of apparatus are contemplated within the scope of the present invention which resides primarily in the concept of logging a bore hole by impressing signals representative of a value or property to be investigated on a magnetizable wire while providing for the interpretation of the record on the wire in such a way as to compensate for the rate of travel of the signal means along the wire.

The nature and objects of the present invention having been thus described and illustrated, what is claimed as new and useful and is desired to be secured by Letters Patent is:

1. An apparatus for logging a borehole comprising a magnetizable wire, means for suspending said wire in a borehole, a body arranged to travel along said wire, magnetic recording means carried by said body and adapted to convert electrical signals into magnetic impressions on said wire, means feeding a first oscillating signal to said recording means, measuring means carried by said body and adapted to measure a quantity representative of a property of said borehole, means electrically connecting said measuring means to said first oscillating signal feeding means to vary the frequency of oscillation of said signal in proportion to the quantity measured, and means carried by said body to feed a second oscillating signal of constant frequency to said recording means.

2. The apparatus according to claim 1 in which said means for moving said body along said wire is adapted to maintain a constant rate of travel of said body along said wire.

BENJAMIN W. SEWELL.

REFERENCES CITED

The following references are of record in the file of this patent:

UNITED STATES PATENTS

| Number | Name | Date |
|--------|------|------|
| 2,167,630 | Bazzoni | Aug. 1, 1939 |
| 2,225,668 | Subkow | Dec. 24, 1940 |
| 2,304,633 | Farnsworth | Dec. 8, 1942 |
| 2,338,991 | Arnold | Jan. 11, 1944 |
| 2,378,383 | Arndt | June 19, 1945 |
| 2,441,065 | Green | May 4, 1948 |
| 2,479,518 | Scherbatskoy | Aug. 16, 1949 |